United States Patent
Okubo et al.

(10) Patent No.: US 8,694,138 B2
(45) Date of Patent: Apr. 8, 2014

(54) SOUND DATA PROCESSING APPARTUS

(75) Inventors: Kenichi Okubo, Osaka (JP); Kenichi Kojima, Gifu (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 1314 days.

(21) Appl. No.: 12/039,884

(22) Filed: Feb. 29, 2008

(65) Prior Publication Data

US 2008/0216635 A1 Sep. 11, 2008

(30) Foreign Application Priority Data

Mar. 7, 2007 (JP) ................................ 2007-056530

(51) Int. Cl.
*G06F 17/00* (2006.01)
*G06F 3/00* (2006.01)
*G06F 9/445* (2006.01)

(52) U.S. Cl.
USPC .............................. 700/94; 719/322; 719/327

(58) Field of Classification Search
USPC ............................. 700/94; 719/321, 322, 327
See application file for complete search history.

(56) References Cited

U.S. PATENT DOCUMENTS

| | | | |
|---|---|---|---|
| 7,039,477 B1 * | 5/2006 | Kamiya et al. ................... | 700/94 |
| 7,913,263 B2 * | 3/2011 | Wu et al. ........................ | 719/321 |
| 2005/0270551 A1 | 12/2005 | Choi | |
| 2006/0245728 A1 | 11/2006 | Mukaihara et al. | |
| 2006/0257107 A1 | 11/2006 | Inokuchi | |
| 2006/0287745 A1 * | 12/2006 | Richenstein et al. ........... | 700/94 |

FOREIGN PATENT DOCUMENTS

| | | |
|---|---|---|
| CN | 1704916 A | 12/2005 |
| CN | 1862691 A | 11/2006 |
| JP | 9-265444 A | 10/1997 |
| JP | 2001-202094 | 7/2001 |
| JP | 2002278781 A | 9/2002 |
| JP | 2005-56237 A | 3/2005 |

OTHER PUBLICATIONS

Chinese Office Action for Chinese Patent Application No. 200810083202.1 issued Jul. 24, 2009 with English translation.
Notice of Grounds for Rejection for Japanese Patent Application No. 2008-039824, mailed May 21, 2013, with English translation.
Japanese Office Action, Notice of Grounds for Rejection, for Japanese patent application No. 2008-039824 mailin date of Sep. 11, 2012 with English translation.

* cited by examiner

*Primary Examiner* — Jesse Elbin

(57) ABSTRACT

A sound data processing apparatus includes a central processing unit for controlling predetermined processing in the apparatus, a rewritable RAM, a decoder performing the decoding processing for sound data, and an interface unit for being fitted with an external memory. The sound data processing apparatus reads a driver from the external memory mounted in the interface unit and stores the read driver into the RAM, and reads the sound data from the external memory with the driver and processes the read sound data. As a result, the wastefully using of the memory capacity of the memory mounted in the sound data processing apparatus is reduced.

4 Claims, 3 Drawing Sheets

SOUND DATA PROCESSING APPARTUS

CROSS-REFERENCE TO RELATED APPLICATION

The entire disclosure of Japanese Patent Application No. 2007-056530 filed on Mar. 7, 2007 including the specification, claims, drawings, and abstract is incorporated herein by reference.

BACKGROUND OF THE INVENTION

1. Field of the Invention

The present invention relates to a sound data processing apparatus for reading sound data stored in an external memory to process the read sound data.

2. Description of the Related Art

In recent years, a sound data processing apparatus for reading sound data stored in an external memory, such as a flash memory, by connecting the external memory to the apparatus, and for performing decoding processing and the like for the read sound data, has been widely used.

The configuration of a related art sound data processing apparatus 100 is shown in FIG. 3. The sound data processing apparatus 100 includes a central processing unit (CPU) 10, a decoder 12, an interface unit (IF unit) 14, and a NOR-type flash memory 16. A NAND-type external memory 102, such as a flash memory, is detected by the CPU 10 by connecting the external memory 102 to the IF unit 14.

The CPU 10 reads a driver for accessing the external memory 102, the driver being stored in the flash memory 16, and accesses the external memory 102 by means of the driver. That is, the CPU 10 reads the sound data stored in the external memory 102 in advance through the IF unit 14 on the basis of an instruction by a user or the like, and transfers the read sound data to the decoder 12 at predetermined timing. The decoder 12 decodes the sound data transferred from the CPU 10 in accordance with a predetermined format, and outputs the decoded sound data as an audio output.

Moreover, the technique of providing an audio system compatible with a multi-codec coping with a plurality of audio codecs was disclosed. The technique was also disclosed that used a CPU to judge whether an audio codec program stored in a RAM incorporated in a digital signal processing unit (DSP) was compatible with music information to be decoded by the digital signal processing unit or not, and that changed the processing of the program according to the compatibility.

Now, various types of NAND-type external memories 102 have been developed in recent years. It is necessary to store numerous drivers compatible with respective types of external memories 102 in the flash memory 16 in advance in order to cope with the various external memories 102. The memory capacity of the flash memory 16 should accordingly be enlarged with every increase in the types of external memory 102.

SUMMARY OF THE INVENTION

An aspect of the present invention is a sound data processing apparatus, including: a rewritable first memory; a decoder for performing sound data decoding processing; an interface unit connected to a second memory storing the sound data and a driver; a read only third memory for storing a boot program executed for reading the driver from the second memory connected to the interface unit and storing the read driver into the first memory; and a central processing unit for controlling processing of the first memory, the third memory, the decoder, and the interface unit, wherein the central processing unit performs control so as to read the driver from the second memory connected to the interface unit based on the boot program and storing the read driver into the first memory, to read the sound data from the second memory connected to the interface unit by means of the driver stored in the first memory, and to transfer the read sound data to the decoder.

BRIEF DESCRIPTION OF THE DRAWINGS

Preferred embodiments of the present invention will be described in detail based on the following drawings, wherein.

DESCRIPTION OF PREFERRED EMBODIMENTS

[Configuration of Apparatus]

Figure 1:
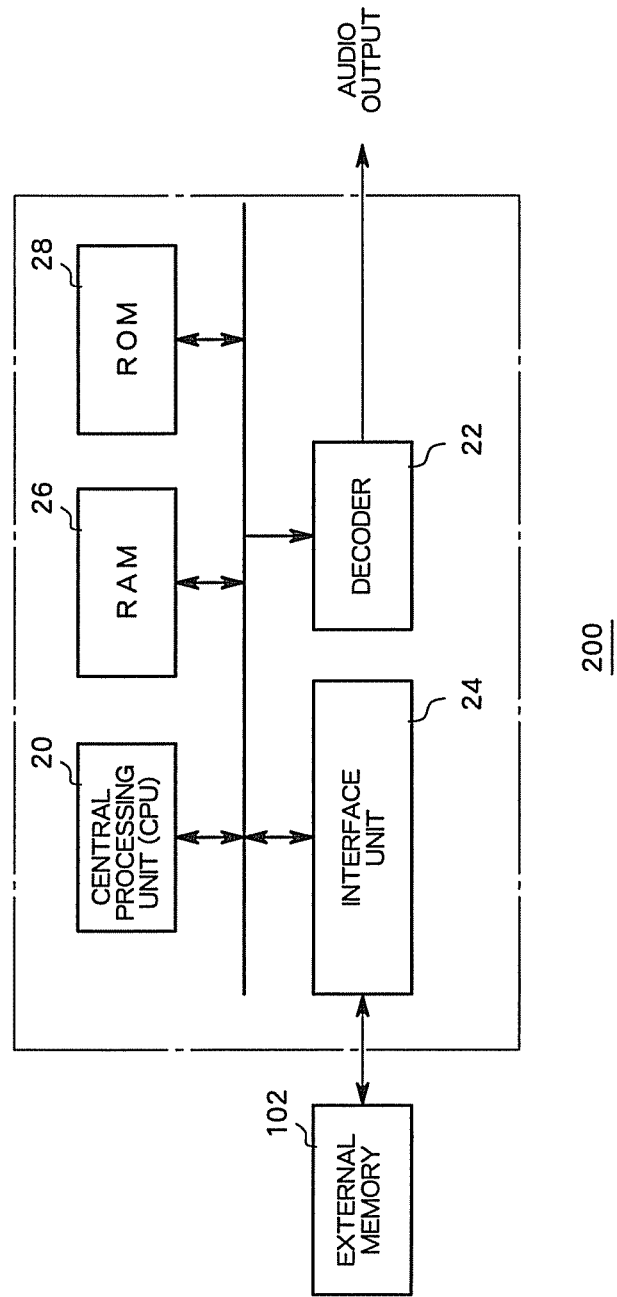
FIG. 1 is a block diagram showing the configuration of a sound data processing apparatus of an embodiment of the present invention.

A sound data processing apparatus 200 of an embodiment of the present invention is composed of a central processing unit (CPU) 20, a decoder 22, an interface unit (IF unit) 24, a volatile memory (RAM) 26, and a nonvolatile memory (ROM) 28, as shown in FIG. 1.

The CPU 20, the decoder 22, the IF unit 24, the RAM 26, and the ROM 28 are connected with one another through a bus so as to be able to mutually exchange data. The sound data processing apparatus 200 is connected to an external memory 102 through the IF unit 24. A memory chip, such as a flash memory, and a memory card can be used as the external memory 102.

The CPU 20 is a semiconductor device to generally control a piece of electronic equipment including the sound data processing apparatus 200. As the electronic equipment to be mounted with the sound data processing apparatus 200, for example, a cellular phone equipped with wireless communication means, a portable music reproducing apparatus, and a personal digital assistant (PDA) for performing data management can be cited. The CPU 20 can be constituted by, for example, an application specific integrated circuit (ASIC). The CPU 20 controls the electronic equipment by accessing a boot program and a library, both stored in the ROM 28. For example, if the sound data processing apparatus 200 is the cellular phone, then the CPU 20 accepts the key input of a user from an operation unit (not shown) connected to the bus, and controls the processing of the wireless transmission and reception of sound signals and electronic mail according to the key input.

Incidentally, the present embodiment has a feature of sound data processing in which the sound data stored in the external memory 102 is read to be processed, but the control of the processing will be described later.

The decoder 22 takes in the sound data subjected to coding processing and compressing processing in a predetermined format from the bus, and performs the expanding processing and the decoding processing of the sound data in accordance with the format. As the coding system of sound data, for example, WMA, AMR, Div X, G.723, and MP3 can be cited.

The IF unit 24 is composed of an adapter unit mounting the external memory 102 therein, a connector unit electrically connected with an external terminal of the external memory 102, and a data processing unit performing the reading and the writing of data with the external memory 102.

The adapter unit of the IF unit 24 is configured to have an insertion space adjusted to the external form of the external memory 102. The connector unit of the IF unit 24 touches an electrode provided on the external memory 102 when the external memory 102 is mounted in the adapter unit, and as a result the connector unit electrically connects the internal electric circuits of the external memory 102 with the data processing unit of the IF unit 24.

The external memory 102 stores a primitive driver necessary for the sound data processing apparatus 200 to access the external memory 102, and an application program necessary for the sound data processing apparatus 200 to perform processing for music data reproduction and the like. If the external memory 102 is a memory card, for example, a control program or a control logic circuit in the data processing unit of the IF unit 24 interprets an instruction for data reading and the like from the CPU 20 through a register in conformity with a PC card ATA standard interface, and converts the instruction into a command according to the type of external memory 102 mounted on the adapter unit. The command is transmitted to the internal electric circuits of the external memory 102, and the data (sound data) stored in the external memory 102 is read.

Incidentally, the sound data processing apparatus 200 performs the processing, such as music data reproduction, by means of the application program stored in the external memory 102 and a basic program, which will be described later, stored in the ROM 28. Because the external memory 102 is a rewritable memory, a developer can rewrite the application program to update the program, or correct bugs. That is, it is preferable to use a program that is capable of being rewritten as the application program stored in the external memory 102.

The RAM 26 is a volatile semiconductor memory. As the RAM 26, an SRAM can be used. The primitive driver and the application program, both read from the external memory 102, are expanded in the RAM 26, and are subjected to processing according to each program by the CPU 20.

The ROM 28 is a nonvolatile semiconductor memory. The ROM 28 stores a boot program for automatically performing a series of processing steps at the time of starting the access to the external memory 102, a library to be used by the driver of the external memory 102, and the basic program necessary for operating the sound data processing apparatus 200.

Incidentally, only the library commonly referred to by each driver for each of a plurality of types of external memories 102 is stored in the ROM 28. That is, a library particularly referred to by each driver is not stored in the ROM 28. Moreover, it is preferable to uses a program having no possibility of being rewritten as the basic program stored in the ROM 28. This prevents wastefully using up the the memory capacity of the ROM 28.

[Control Method]

Figure 2:
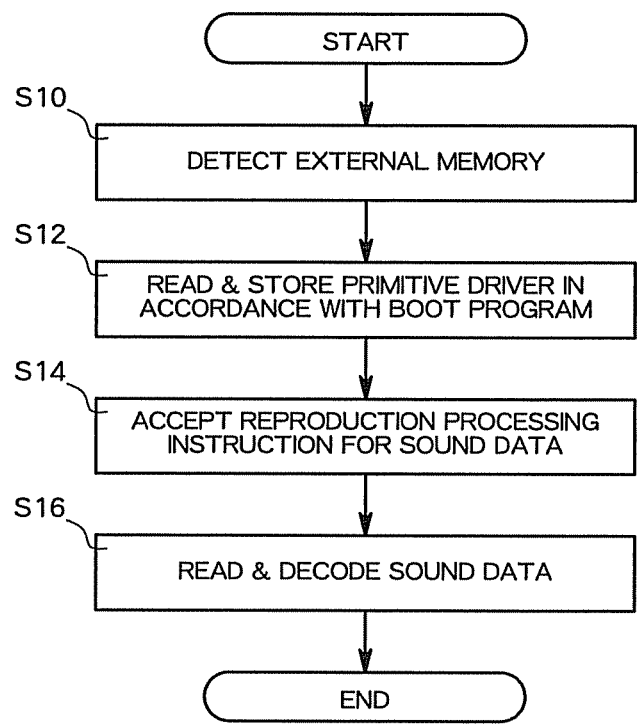
FIG. 2 is a flow chart showing a processing method of the sound data processing apparatus of the embodiment of the present invention.
Figure 3:
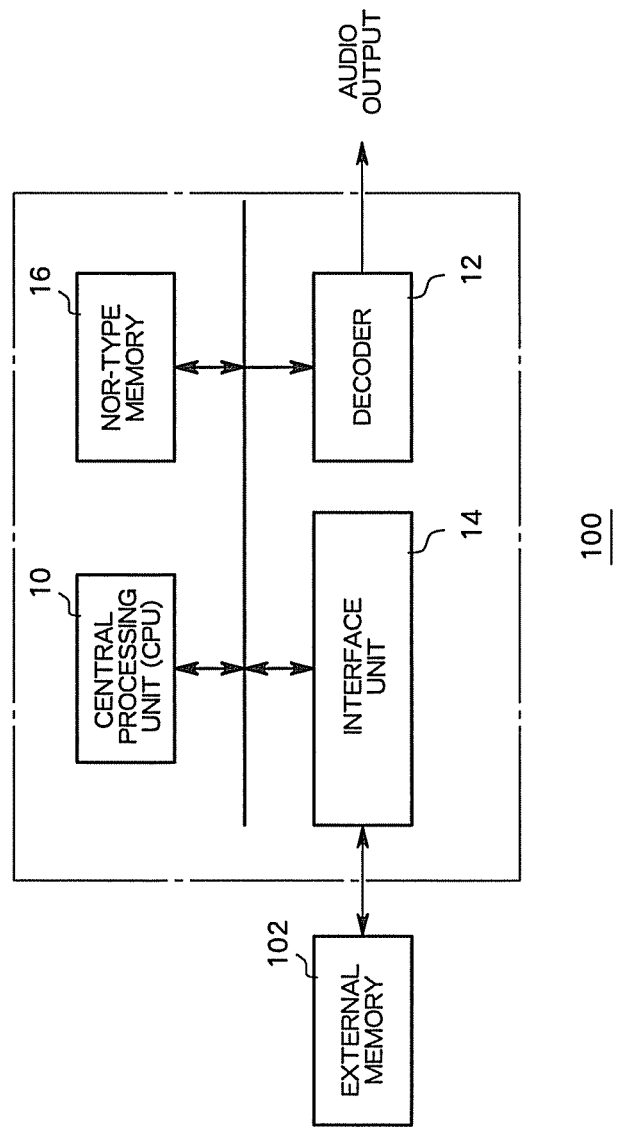
FIG. 3 is a block diagram showing the configuration of a related art sound data processing apparatus.

Next, the control of the sound data processing apparatus 200 of the present embodiment will be described with reference to the flow chart shown in FIG. 2.

At Step S10, the external memory 102 is detected by the CPU 20. When the external memory 102 is mounted on the IF unit 24, the CPU 20 is electrically connected to the external memory 102 through the IF unit 24. By always outputting a signal o allow the CPU 20 to detect the mounting of the external memory 102 into the IF unit 24, the electrical connection of the IF unit 24 with the external memory 102 can be detected.

At Step S12, the primitive driver is read from the external memory 102 in accordance with the boot program. When the external memory 102 is detected by the CPU 20 at Step S10, the CPU 20 reads a program called an initial program loader (IPL), which is previously stored in the ROM 28. By executing the IPL, the CPU 20 invokes the boot program recorded in an area called a boot sector of the area called a master boot record (MBR) of the ROM 28.

The boot program is a program for reading the primitive driver stored in the external memory 102. The primitive driver is stored in common memory spaces in various types of the external memories 102. The CPU 20 accesses the predetermined memory space of the external memory 102 and reads the stored primitive driver to store the read primitive driver into the RAM 26 in accordance with the boot program.

Moreover, if there is information, such as the library, peculiar to the primitive driver, then it is preferable to store also this information into the external memory 102 in advance, and to read the information together with the primitive driver and store them in the RAM 26.

At Step S14, the application program is read from the external memory 102 to be expanded in the RAM 26, and an instruction of the reproduction processing of sound data is accepted on the basis of the basic program stored in the ROM 28 and the application program expanded in the RAM 26. The CPU 20 accepts a sound data reproduction processing instruction through a user interface (not shown), such as the operation unit, and specifying information for specifying the sound data of a reading object. The specifying information is, for example, a file name or the like that is specifically added to the sound data. Moreover, the sound data processing apparatus 200 may be adapted so that the CPU 20 may display a file name list of sound data that has been previously read from the external memory 102 mounted in the IF unit 24 on the display unit (not shown) of the user interface, to allow a user to select the file name of the sound data of the reproduction object in the list.

At Step S16, the CPU 20 accesses the external memory 102 in accordance with the read primitive driver, and performs the reproduction processing for the sound data. The CPU 20 accesses the header area in which the information expressing the memory area storing each sound data therein is registered by means of the primitive driver stored in the RAM 26 at Step S12, and ascertains the starting address and the ending address of the memory area in which the sound data specified by the specifying information input at Step S14 is stored. The CPU 20 then sequentially reads the data from the starting address to the ending address, and transmits the read data to the decoder 12. When the decoder 12 receives the transmitted sound data, the decoder 12 decodes the sound data and converts it into an audio signal in accordance with the format of the sound data, and outputs the converted sound signal.

Incidentally, if it is necessary for the primitive driver to refer to a library, it is preferable for the primitive driver to perform the processing, referring to the library stored in the RAM 26 or the ROM 28. That is, because the library commonly referred to by a plurality of drivers is previously stored in the ROM 28, the primitive driver can refer to the library. Moreover, because the library specific to a primitive driver has been read from the external memory 102 at Step S12 to be stored in the RAM 26, the primitive driver can refer to the library in the RAM 26.

As described above, the present embodiment reads the primitive driver stored in the external memory 102 and stores the read primitive driver into the built-in memory, and accesses the external memory 102 on the basis of the primitive driver. It therefore becomes unnecessary to store numerous drivers in the sound data processing apparatus 200 in advance. Consequently, the memory capacity of the built-in memory can be reduced in comparison with that of the related art.

Moreover, the present embodiment is configured to store the boot program, the library, and the basic program in the ROM 28, and to store the primitive driver and the application program in the external memory 102. Because some of the programs are transformed as library and stored in the ROM 28, the size of the programs stored in the external memory 102 can be reduced. Therefore the storage capacity of the RAM 26, in which the programs stored in the external memory 102 are expanded, can be reduced so that the circuit size can be reduced. If the ROM 28 is made of a mask ROM and the RAM 26 is made of an SRAM, the mask ROM can make the circuit size thereof smaller than that of the SRAM. Consequently, the circuit size of the sound data processing apparatus 200 can be reduced more in comparison with that in the case of storing all the programs in the external memory 102. Because the programs having the possibility of being rewritten are stored in the external memory 102, it is possible to rewrite the programs for updating the programs or for correcting bugs.

What is claimed is:

1. A sound data processing apparatus, comprising:
   a first memory, that is rewritable;
   a decoder for performing decoding processing for sound data;
   an interface unit connected to a second memory storing the sound data and an interface driver for reading out the sound data, the second memory being an external memory;
   a third memory, that is read only memory, storing a boot program executed for reading the interface driver from the second memory connected to the interface unit and storing the read interface driver into the first memory; and
   a central processing unit for controlling processing of the first memory, the third memory, the decoder, and the interface unit, wherein
   the central processing unit performs control so as to read the interface driver from the external memory connected to the interface unit based on the boot program and store the interface driver into the first memory,
   read the sound data from the second memory connected to the interface unit by means of the interface driver stored in the first memory, and
   transfer the read sound data to the decoder.

2. The sound data processing apparatus according to claim 1, wherein
   the second memory stores an application program for performing reproduction processing for the sound data, and
   the third memory stores a basic program for performing the reproduction processing for the sound data.

3. The sound data processing apparatus according to claim 1, wherein
   the first memory is an SRAM, and
   the third memory is a mask ROM.

4. The sound data processing apparatus according to claim 2, wherein
   the first memory is an SRAM, and
   the third memory is a mask ROM.

* * * * *